(12) United States Patent
Liu et al.

(10) Patent No.: US 12,639,906 B2
(45) Date of Patent: May 26, 2026

(54) VISUAL STYLE TRANSFORMATION USING MACHINE LEARNING

(71) Applicant: Roblox Corporation, San Mateo, CA (US)

(72) Inventors: Hsueh-Ti Derek Liu, Vancouver (CA); Victor B. Zordan, Riverside, CA (US); Chrystiano Araújo, San Mateo, CA (US); Maneesh Agrawala, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 211 days.

(21) Appl. No.: 18/649,614

(22) Filed: Apr. 29, 2024

(65) Prior Publication Data

US 2025/0336164 A1     Oct. 30, 2025

(51) Int. Cl.
*G06T 19/20*     (2011.01)
*G06V 10/771*     (2022.01)

(52) U.S. Cl.
CPC ............ *G06T 19/20* (2013.01); *G06V 10/771* (2022.01); *G06T 2219/2024* (2013.01)

(58) Field of Classification Search
CPC ............. G06T 19/20; G06T 2219/2021; G06T 2219/2024; G06V 10/771
See application file for complete search history.

(56) References Cited

U.S. PATENT DOCUMENTS

| | | | |
|---|---|---|---|
| 2022/0156415 A1* | 5/2022 | Meltzer | G06N 3/0895 |
| 2022/0245510 A1* | 8/2022 | Abhinav | G06N 3/045 |
| 2023/0326158 A1* | 10/2023 | Shayani | G06T 19/20 |
| | | | 345/419 |

OTHER PUBLICATIONS

Carl Doersch, et al., "What Makes Paris Look Like Paris?", ACM Transactions on Graphics. vol. 31, 1-9., 2012, 8 pages.
Hsueh-Ti Derek Liu, et al., "Cubic Stylization", ACM SIGGRAPH Asia. Association for Computing Machinery, New York, NY, USA, vol. 38, No. 6, Article 197, 1-10. https://doi.org/10.1145/3355089. 3356495, Nov. 2019, 10 Pages.
Hsueh-Ti Derek Liu, et al., "Normal-Driven Spherical Shape Analogies", Eurographics Symposium on Geometry Processing 2021, vol. 40 (2021), No. 5, 45-55. https://doi.org/10.1111/cgf.14356, 11 pages.
Isaak Lim, et al., "Identifying Style of 3D Shapes using Deep Metric Learning", Computer Graphics Forum, vol. 35, No. 5, 207-215. https://doi.org/10.1111/cgf.12977, 2016, 9 pages.

(Continued)

*Primary Examiner* — King Y Poon
*Assistant Examiner* — Vincent Peren
(74) *Attorney, Agent, or Firm* — IP Spring

(57) ABSTRACT

According to one aspect of the present disclosure, a method is provided. The method may include receiving a visual asset. The method may include receiving an indicator of a visual style. The method may include identifying a set of distinctive-style features for the visual style using a loss function calculated based on a first summation of differences among a first set of Gram Matrix pairs and a second summation of differences among a second set of Gram Matrix pairs. The method may include modifying a geometry of the visual asset to match the set of distinctive-style features identified for the visual style. After the modifying, the method may include rendering the visual asset that matches the set of distinctive-style features.

20 Claims, 9 Drawing Sheets

Input Shape 502

Rendered Asset 504

(56)           References Cited

OTHER PUBLICATIONS

Leon A. Gatys, "A Neural Algorithm of Artistic Style", arXiv preprint arXiv:1508.06576., 2015, 16 Pages.
Zhaoliang Lun, et al., "Elements of style: learning perceptual shape style similarity", ACM Transactions on Graphics. vol. 34, 1-14. https://doi.org/10.1145/2766929, 14 Pages.
"Standardization of Gram Matrix for Improved 3D Neural Style Transfer", 2019 IEEE Symposium Series on Computational Intelligence (SSCI), IEEE, Dec. 6, 2019 (Dec. 6, 2019), pp. 1375-1382, XP033717135, DOI: 10.1109/SSCI44817.2019.9002780 [retrieved on Feb. 18, 2020].
"Extended Search Report in EP. Application No. 25172951.3", Jul. 23, 2025, 5 pages.
Yanghao Li, et al., "Demystifying Neural Style Transfer", Jul. 1, 2017 (Jul. 1, 2017), XP093294034, Retrieved from the Internet: URL:https://arxiv.org/pdf/1701.01036.

* cited by examiner

Positive Input Samples 202

Negative Input Samples 204

Negative Input Samples 204

Negative Input Samples 204

Negative Input Samples 204

200

301

Gram Matrix 306

$G_x$

=

Flattened Vertical Feature Maps 304b $F_x^T$

×

Flattened Horizontal Feature Maps 304a $F_x$

400

Serif Decorations
402

Change in
Thickness
404

500

Input
Shape
502

Rendered
Asset
504

VISUAL STYLE TRANSFORMATION USING MACHINE LEARNING

TECHNICAL FIELD

Embodiments relate generally to online virtual experience platforms, and more particularly, to methods, systems, and computer readable media to identify distinctive-style features of a visual asset and to perform visual style transformations for visual assets to match a target style.

BACKGROUND

Online platforms, such as virtual experience platforms and online gaming platforms, enable a user to create virtual experiences or games with a specific style. The specific style may apply to visual assets within the virtual experience or game.

Existing techniques for 3D stylization are either designed to address a specific design style or use an example shape where a target visual style can be encoded by surface normals thereto. However, neither of these address the general stylization problem in which a user wants to modify a source 3D object to mimic the style of a target scene or object. To solve this problem, a method capable of extracting the set of discriminative features that distinguish the visual style across source and target objects is used.

Existing methods for identifying a similarity metric used to evaluate the degree-of-style similarity among different shapes often rely on a hand-crafted set of shape descriptors, which do not guarantee generalization across different design styles. Finding a weighted balance among such descriptors is complex, and some methods use deep-learning models to jointly infer the set of shape descriptors and the weights balancing them. This method computes style similarity in the image space. Unfortunately, selecting the set of rendered views a priori is complex and directly impacts the final metric because important style features may not be captured by the selected views. Consequently, existing techniques to estimate style similarity fail to provide a technique that extracts the set of features that are discriminative for a style.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of this disclosure are directed to methods, systems, and computer readable media to identify distinctive-style features of an input shape for application to a virtual experience or asset.

According to one aspect of the present disclosure, a computer-implemented method is provided. The method may include receiving, by a processor, a visual asset. The method may include receiving, by the processor, an indicator of a visual style. The method may include identifying, by the processor, a set of distinctive-style features for the visual style using a loss function calculated based on a first summation of differences among a first set of Gram Matrix pairs and a second summation of differences among a second set of Gram Matrix pairs. The first set of Gram Matrix pairs may be associated with a set of positive input samples of a same visual style and the second set of Gram Matrix pairs may be associated with a set of negative input samples of different visual styles. The method may include modifying, by the processor, a geometry of the visual asset to match the set of distinctive-style features identified for the visual style. After the modifying, the method may include rendering, by the processor, the visual asset that matches the set of distinctive-style features.

In some implementations, the method may include receiving, by the processor, the set of positive input samples of the same visual style and the set of negative input samples of the different visual styles. In some implementations, the method may include generating, by the processor, a first set of feature maps associated with the set of positive input samples and a second set of feature maps associated with the set of negative input samples. In some implementations, the method may include obtaining, by the processor, the first set of Gram Matrix pairs associated with the set of positive input samples based on the first set of feature maps and the second set of Gram Matrix pairs associated with the set of negative input samples based on the second set of feature maps. In some implementations, the method may include calculating, by the processor, the loss function based on the first summation of differences of the first set of Gram Matrix pairs and the second summation of the second set of Gram Matrix pairs.

In some implementations, the set of positive input samples associated with the same visual style may include a first set of shape pairs of a same style. In some implementations, the set of negative input samples associated with the different visual styles may include a second set of shape pairs of different styles.

In some implementations, one shape of the second set of shape pairs may have the same style as the style of the first set of shape pairs.

In some implementations, generating the first set of feature maps associated with the set of positive input samples and the second set of feature maps associated with the set of negative input samples may include applying, by the processor, a set of convolution filters to the set of positive input samples to generate the first set of feature maps. In some implementations, generating the first set of feature maps associated with the set of positive input samples and the second set of feature maps associated with the set of negative input samples may include applying, by the processor, the set of convolution filters to the set of negative input samples to generate the second set of feature maps.

In some implementations, the set of convolution filters may include kernels of different sizes.

In some implementations, obtaining the first set of Gram Matrix pairs associated with the set of positive input samples based on the first set of feature maps and a second set of Gram Matrix pairs associated with the set of negative input samples based on the second set of feature maps may include determining, by the processor, a first correlation among the first set of feature maps associated with set of positive input samples to obtain the first set of Gram Matrix pairs. In some implementations, obtaining the first set of Gram Matrix pairs associated with the set of positive input samples based on the first set of feature maps and a second set of Gram Matrix pairs associated with the set of negative input samples based on the second set of feature maps may include determining, by the processor, a second correlation among the second set of feature maps associated with the set of negative input samples to obtain the second set of Gram Matrix pairs.

According to another aspect of the present disclosure, a computing device is provided. The computing device may include a processor and a memory coupled to the processor, with instructions stored thereon that, when executed by the processor, cause the processor to perform operations. The operations may include receiving, by a processor, a visual asset. The operations may include receiving, by the processor, an indicator of a visual style. The operations may include identifying, by the processor, a set of distinctive-style features for the visual style using a loss function calculated based on a first summation of differences among a first set of Gram Matrix pairs and a second summation of differences among a second set of Gram Matrix pairs. The first set of Gram Matrix pairs may be associated with a set of positive input samples of a same visual style and the second set of Gram Matrix pairs may be associated with a set of negative input samples of different visual styles. The operations may include modifying, by the processor, a geometry of the visual asset to match the set of distinctive-style features identified for the visual style. After the modifying, the operations may include rendering, by the processor, the visual asset that matches the set of distinctive-style features.

In some implementations, the operations may include receiving, by the processor, the set of positive input samples of the same visual style and the set of negative input samples of the different visual styles. In some implementations, the operations may include generating, by the processor, a first set of feature maps associated with the set of positive input samples and a second set of feature maps associated with the set of negative input samples. In some implementations, the operations may include obtaining, by the processor, the first set of Gram Matrix pairs associated with the set of positive input samples based on the first set of feature maps and the second set of Gram Matrix pairs associated with the set of negative input samples based on the second set of feature maps. In some implementations, the operations may include calculating, by the processor, the loss function based on the first summation of differences of the first set of Gram Matrix pairs and the second summation of the second set of Gram Matrix pairs.

In some implementations, the set of positive input samples associated with the same visual style may include a first set of shape pairs of a same style. In some implementations, the set of negative input samples associated with the different visual styles may include a second set of shape pairs of different styles.

In some implementations, one shape of the second set of shape pairs may have the same style as the style of the first set of shape pairs.

In some implementations, generating the first set of feature maps associated with the set of positive input samples and the second set of feature maps associated with the set of negative input samples may include applying, by the processor, a set of convolution filters to the set of positive input samples to generate the first set of feature maps. In some implementations, generating the first set of feature maps associated with the set of positive input samples and the second set of feature maps associated with the set of negative input samples may include applying, by the processor, the set of convolution filters to the set of negative input samples to generate the second set of feature maps.

In some implementations, the set of convolution filters may include kernels of different sizes.

In some implementations, obtaining the first set of Gram Matrix pairs associated with the set of positive input samples based on the first set of feature maps and a second set of Gram Matrix pairs associated with the set of negative input samples based on the second set of feature maps may include determining, by the processor, a first correlation among the first set of feature maps associated with set of positive input samples to obtain the first set of Gram Matrix pairs. In some implementations, obtaining the first set of Gram Matrix pairs associated with the set of positive input samples based on the first set of feature maps and a second set of Gram Matrix pairs associated with the set of negative input samples based on the second set of feature maps may include determining, by the processor, a second correlation among the second set of feature maps associated with the set of negative input samples to obtain the second set of Gram Matrix pairs.

According to a further aspect of the present disclosure, a non-transitory computer-readable medium with instructions stored thereon is provided. The instructions that, when executed by a processor, cause the processor to perform operations. The operations may include receiving, by a processor, a visual asset. The operations may include receiving, by the processor, an indicator of a visual style. The operations may include identifying, by the processor, a set of distinctive-style features for the visual style using a loss function calculated based on a first summation of differences among a first set of Gram Matrix pairs and a second summation of differences among a second set of Gram Matrix pairs. The first set of Gram Matrix pairs may be associated with a set of positive input samples of a same visual style and the second set of Gram Matrix pairs may be associated with a set of negative input samples of different visual styles. The operations may include modifying, by the processor, a geometry of the visual asset to match the set of distinctive-style features identified for the visual style. After the modifying, the operations may include rendering, by the processor, the visual asset that matches the set of distinctive-style features.

In some implementations, the operations may include receiving, by the processor, the set of positive input samples of the same visual style and the set of negative input samples of the different visual styles. In some implementations, the operations may include generating, by the processor, a first set of feature maps associated with the set of positive input samples and a second set of feature maps associated with the set of negative input samples. In some implementations, the operations may include obtaining, by the processor, the first set of Gram Matrix pairs associated with the set of positive input samples based on the first set of feature maps and the second set of Gram Matrix pairs associated with the set of negative input samples based on the second set of feature maps. In some implementations, the operations may include calculating, by the processor, the loss function based on the first summation of differences of the first set of Gram Matrix pairs and the second summation of the second set of Gram Matrix pairs.

In some implementations, the set of positive input samples associated with the same visual style may include a first set of shape pairs of a same style. In some implementations, the set of negative input samples associated with the different visual styles may include a second set of shape pairs of different styles.

In some implementations, one shape of the second set of shape pairs may have the same style as the style of the first set of shape pairs.

In some implementations, generating the first set of feature maps associated with the set of positive input samples and the second set of feature maps associated with the set of negative input samples may include applying, by the processor, a set of convolution filters to the set of positive input samples to generate the first set of feature maps. In some implementations, generating the first set of feature maps associated with the set of positive input samples and the second set of feature maps associated with the set of negative input samples may include applying, by the processor, the set of convolution filters to the set of negative input samples to generate the second set of feature maps.

In some implementations, the set of convolution filters may include kernels of different sizes.

In some implementations, obtaining the first set of Gram Matrix pairs associated with the set of positive input samples based on the first set of feature maps and a second set of Gram Matrix pairs associated with the set of negative input samples based on the second set of feature maps may include determining, by the processor, a first correlation among the first set of feature maps associated with set of positive input samples to obtain the first set of Gram Matrix pairs. In some implementations, obtaining the first set of Gram Matrix pairs associated with the set of positive input samples based on the first set of feature maps and a second set of Gram Matrix pairs associated with the set of negative input samples based on the second set of feature maps may include determining, by the processor, a second correlation among the second set of feature maps associated with the set of negative input samples to obtain the second set of Gram Matrix pairs.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
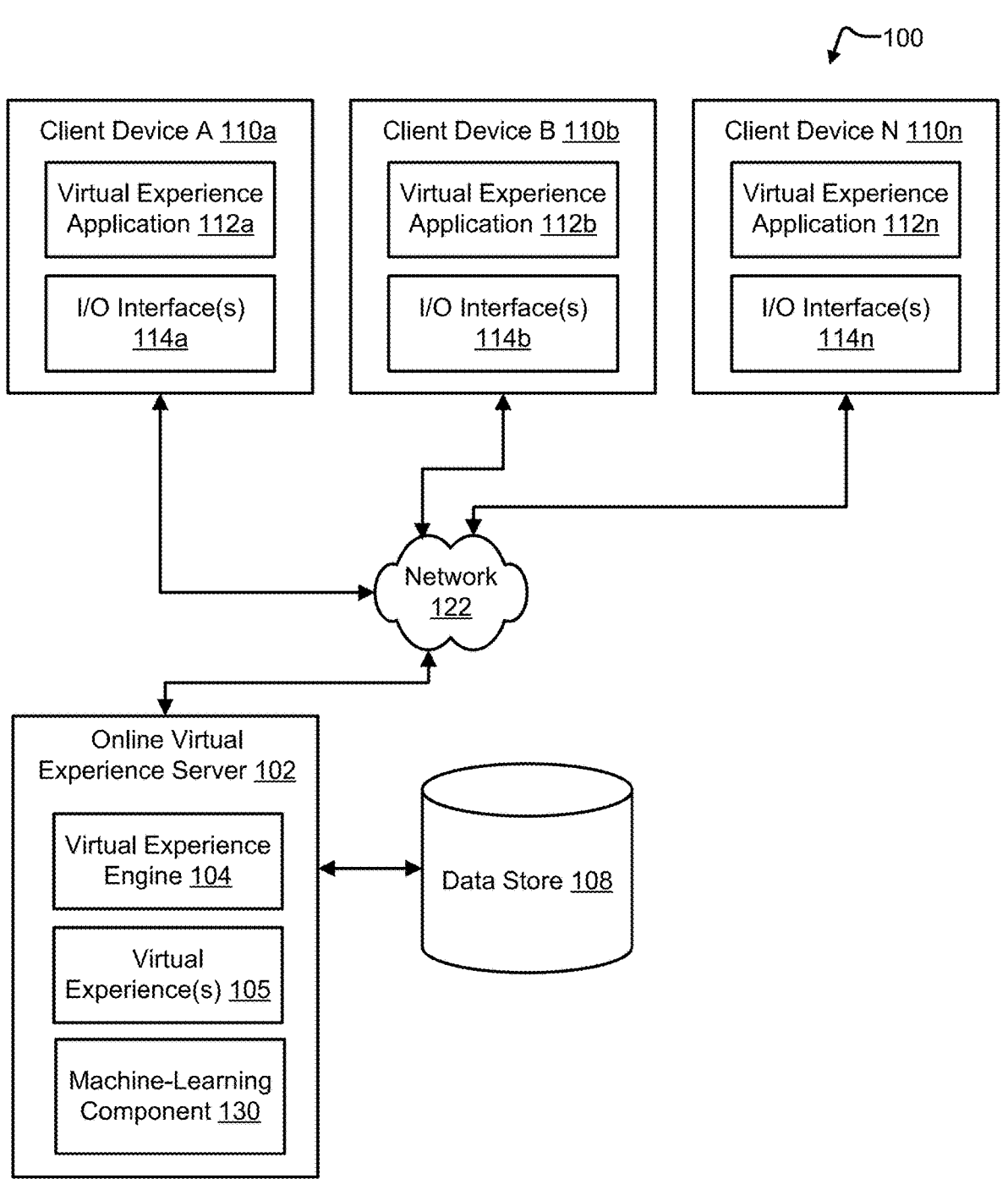
FIG. 1 is a diagram of an example network environment, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Recent advances in gaming, metaverse, and user-generated content (UGC) platforms have lowered the expertise barrier when designing visual assets (e.g., 2D or 3D avatars, objects, and scenes). However, designing virtual environments is still a complex task, and a significant amount of user time is spent creating new 3D objects, modifying 3D objects, or selecting existing 3D objects to compose the desired scenes. Designing 3D objects from scratch is a complex and time-consuming task, but with the rapid growth of commercial and platform-specific 3D-asset marketplaces, users are able to browse and find existing objects that match a particular aesthetic. However, besides finding objects that align with a specific aesthetic, composing scenes with style-compatible objects and assets is key to designing visually appealing virtual experiences. To that end, users may expend a significant amount of time and effort to find objects that match a specific style. Consequently, users may reuse existing 3D objects to avoid the complex task of creating new ones from scratch, thereby compromising on the specifications style of the particular style.

Providing easy-to-use tools for geometric-style analysis and manipulation has the potential to improve how both novice and expert-users compose 3D environments and objects. For instance, guiding users to select style-compatible assets can significantly simplify their navigation through 3D-asset marketplaces. This may assist non-expert users in creating more visually appealing and professional scenes. Furthermore, providing editing tools to automatically change the visual style of existing objects enables users to reuse any existing 3D asset and coherently compose virtual experiences of any style. Finally, coupling geometric-style analysis and control capabilities to generative models can effectively remove the expertise barrier involved in overall virtual experience design. For instance, a generative model may be tasked with creating visual assets that match the style embedding and other style specification (e.g., "generate a rabbit in cubic style," where cubic style is indicated by the style embedding).

The present disclosure provides techniques to automatically extract a set of discriminative-style features for individual styles using a loss function generated by contrasting shapes of distinct image styles. For instance, the present disclosure uses artificial intelligence (AI)-based techniques to automatically learn the set of distinctive-style features that are unique to each input visual style. Distinctive-style features are features that are consistently found within a visual asset of an input visual style while being distinct from features common to the input visual style and another visual style simultaneously.

For instance, the shape of corners, decorations, thicknesses, or curvature may be distinctive-style features that distinguish a Sans-Serif font from a Serif font. By training a machine learning model to identify distinguishing features for a style from other styles, the implementations described herein can estimate style similarity between shapes and manipulate the geometry of an asset to match an input shape for a virtual environment.

To that end, the present method optimizes a set of convolutional filter weights that activate the geometric features that characterize the distinctive-style features of an input style. Using the optimized set of convolutional filter weights, a convolutional neural network (CNN) learns distinctive-style features based on a loss function generated using the optimized set of convolutional filter weights. Once trained, the CNN may identify distinctive-style features for any 2D or 3D shape a user may use as input. In this way, the present disclosure may manipulate the geometry of objects and assets for a virtual environment to conform to the distinctive-style features of a particular aesthetic, thereby reducing the amount of time and effort used in creating a visually appealing experience.

FIG. 1: System Architecture

FIG. 1 illustrates an example network environment 100, in accordance with some implementations of the disclosure. FIG. 1 and the other figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral (e.g., "110" in the text refers to reference numerals "110*a*," "110*b*," and/or "110*n*" in the figures).

The network environment 100 (also referred to as a "platform" herein) includes an online virtual experience server 102, a data store 108, a client device 110 (or multiple client devices), and a third party server 118, all connected via a network 122.

The online virtual experience server 102 can include, among other things, a virtual experience engine 104, one or more virtual experiences 105, and a machine-learning component 130. The machine-learning model component 130 may include a model that is trained to identify distinctive-style features. Once trained, the model may modify or generate visual assets in a particular style associated with distinctive-style features of an input visual asset. The online virtual experience server 102 may be configured to provide virtual experiences 105 to one or more client devices 110, to provide automatic generation of a loss function via the machine-learning component 130, and to provide the automatic generation of virtual experience assets (e.g., objects, avatars, etc.) that conform to the style-features of an input image using a CNN trained using a loss function, in some implementations.

The data store 108 is shown coupled to online virtual experience server 102. However, in some implementations, the data store 108 can also be provided as part of the online virtual experience server 102. The data store 108 may be configured to store advertising data, user data, engagement data, and/or other contextual data in association with the machine-learning component 130, in some implementations.

Each client device 110 (e.g., 110*a*, 110*b*, 110*n*) may include a virtual experience application 112 (e.g., 112*a*, 112*b*, 112*n*) and an I/O interface 114 (e.g., 114*a*, 114*b*, 114*n*), to interact with the online virtual experience server 102, and to view, for example, graphical user interfaces (GUI) through a computer monitor or display (not illustrated). In some implementations, the client devices 110 may be configured to execute and display virtual experiences, which may include a virtual user engagement portal, as described herein.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., a 702.11 network, a Wi-Fi® network, or wireless LAN (WLAN)), a cellular network (e.g., a Long Term Evolution (LTE) network, Fifth Generation (5G) New Radio (NR)), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, virtual server, etc.). In some implementations, a server may be included in the online virtual experience server 102, be an independent system, or be part of another system or platform. In some implementations, the online virtual experience server 102 may be a single server, or any combination a plurality of servers, load balancers, network devices, and other components. The online virtual experience server 102 may also be implemented on physical servers, but may utilize virtualization technology, in some implementations. Other variations of the online virtual experience server 102 are also applicable.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user (via client device 110) with access to the online virtual experience server 102.

The online virtual experience server 102 may also include a website (e.g., one or more web pages) or application back-end software that may be used to provide a user with access to content provided by the online virtual experience server 102. For example, users (or developers) may access the online virtual experience server 102 using the virtual experience application 112 on the client device 110, respectively.

In some implementations, online virtual experience server 102 may include digital asset and digital virtual experience generation provisions. For example, the platform may provide administrator interfaces allowing the design, modification, unique tailoring for individuals, and other modification functions. In some implementations, virtual experiences may include two-dimensional (2D) games, three-dimensional (3D) games, virtual reality (VR) games, or augmented reality (AR) games, for example. In some implementations, virtual experience creators and/or developers may search for virtual experiences, combine portions of virtual experiences, tailor virtual experiences for particular activities (e.g., group virtual experiences), and other features provided through the virtual experience server 102.

In some implementations, online virtual experience server 102 or client device 110 may include the virtual experience engine 104 or virtual experience application 112. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.).

The online virtual experience server 102, using virtual experience engine 104, may perform some or all the virtual experience engine functions (e.g., generate physics commands, rendering commands, etc.), or offload some or all the virtual experience engine functions to a virtual experience engine (not illustrated) at the client device 110. In some implementations, each virtual experience 105 may have a different ratio between the virtual experience engine functions that are performed on the online virtual experience server 102 and the virtual experience engine functions that are performed on the client device 110.

In some implementations, virtual experience instructions may refer to instructions that allow a client device 110 to render gameplay, graphics, and other features of a virtual experience. The instructions may include one or more of user input (e.g., physical object positioning), character position and velocity information, or commands (e.g., physics commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided by way of example and not limitation. In some implementations, any number of client devices 110 may be used.

In some implementations, each client device 110 may include an instance of the virtual experience application 112. The virtual experience application 112 may be rendered for interaction at the client device 110. During user interaction within a virtual experience or another GUI of the network environment 100, a user may create an asset (e.g., object, avatar, etc.) that includes distinctive-style features. For instance, a user may input image data associated with an image style into the machine-learning component 130. The machine-learning component 130 may identify a set of distinctive-style features associated with the visual style using a CNN with kernel weights that are trained using a loss function to identify these features. The machine-learning component 130 may adjust various features (e.g., shapes, curvatures, angles, etc.) of an asset, object, and/or scene to conform to the set of distinctive-style features of the visual style indicator (e.g., input image data). Once its features have been adjusted to conform to the set of distinctive-style features, the asset may be rendered by the machine-learning component 130.

The machine-learning component 130 may use convolution filters, and their corresponding feature maps, to represent the identified set of distinctive-style features. However, because the set of discriminative-style features are initially unknown, the kernel weights are also unknown prior to training and cannot be hand-crafted a priori. To identify the kernel weights, the machine-learning component 130 may iteratively optimize the convolutional filters of a CNN so the extracted features are maximally aligned to identify discriminative-style features. To that end, the learned features must satisfy the following conditions: 1) the features must frequently appear within a style, and 2) the features must be distinct from features that are simultaneously common to two or more styles.

The machine-learning component 130 models these requirements softly as individual terms in the contrastive framework. Contrastive learning aims to encourage the extracted style features to be the same for objects belonging to the same style, and different for objects with different styles. However, these goals cannot be modeled directly based on the learned feature maps because they are location dependent. This means that convolving the same set of learned filters to inputs of the same style but with slightly different locations results in different feature maps. Consequently, feature maps do not provide a reliable metric for style comparison.

Hereinafter, a more detailed discussion of the machine-learning component 130 and its operations are presented with reference to FIGS. 2-5.

FIGS. 2-5: Training and Using the Distinctive-Feature Model Component

Figure 2:
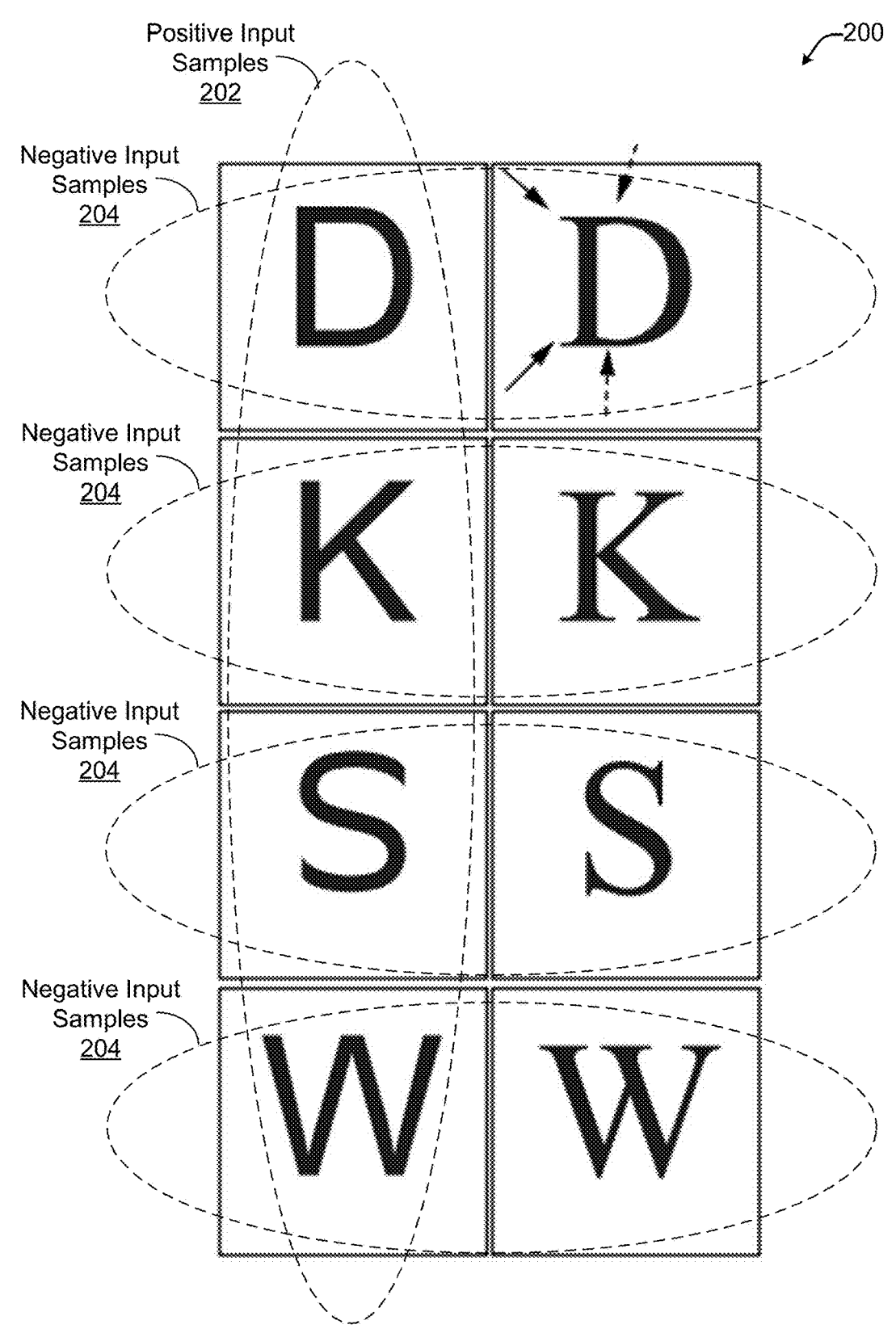
FIG. 2 is a diagram of a set of positive input samples and a set of negative input samples, in accordance with some implementations.
Figure 3A:
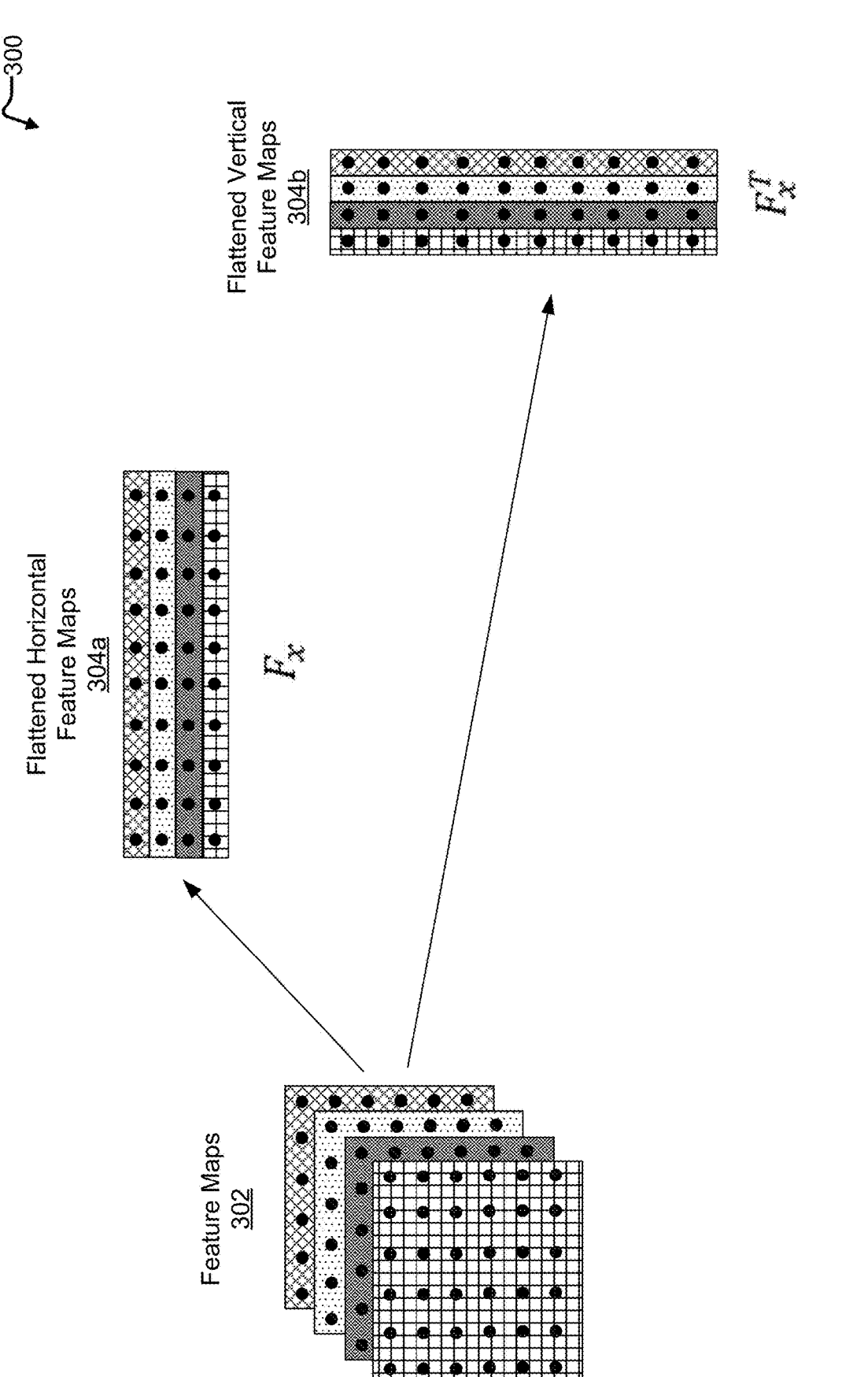
FIG. 3A illustrates an example diagram of feature maps, in accordance with some implementations.
Figure 3B:
FIG. 3B illustrates a diagram of an example Gram-matrix computation based on the feature maps of FIG. 3A, in accordance with some implementations.
Figure 3B:
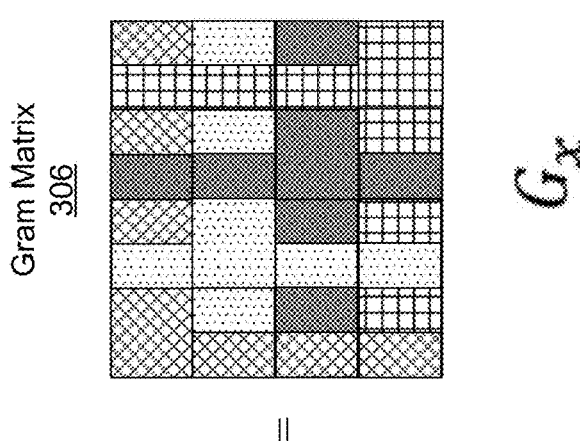
Figure 3B:
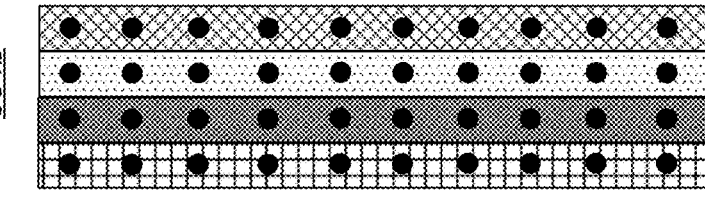
Figure 3B:
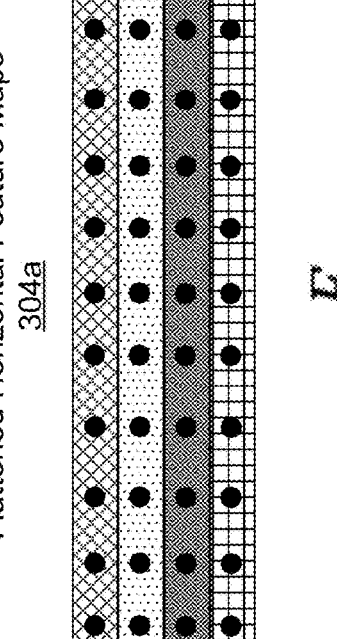
Figure 4:
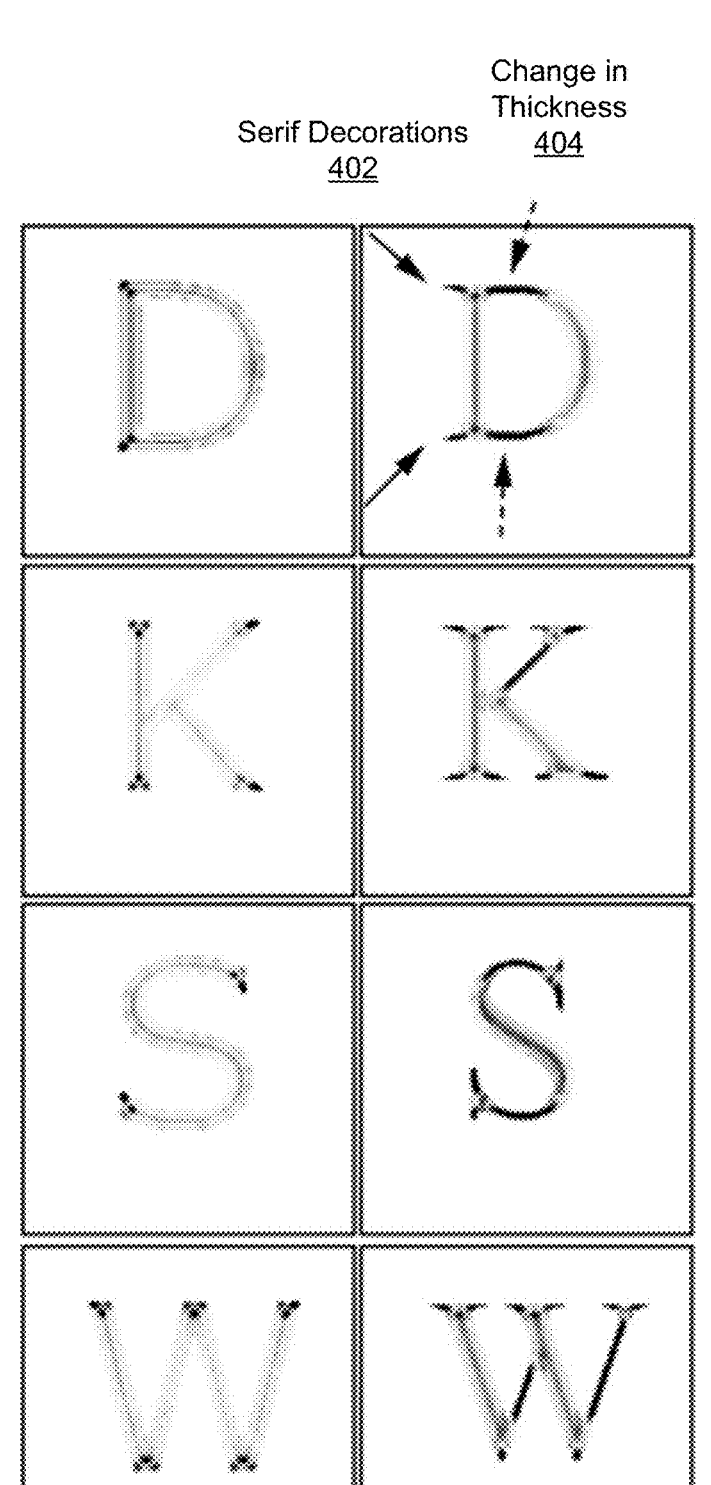
FIG. 4 is a diagram of a set of distinctive-style features identified based on the set of positive input samples and the set of negative input samples of FIG. 2, in accordance with some implementations.
Figure 5:
FIG. 5 is a diagram of input shapes and corresponding rendered assets, in accordance with some implementations.
Figure 5:
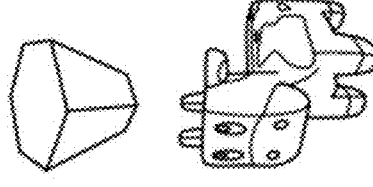
Figure 5:
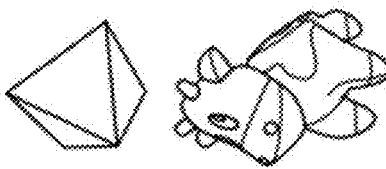
Figure 5:
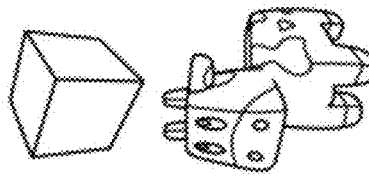
Figure 5:
Figure 5:
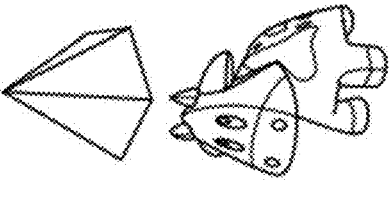
Figure 5:

FIG. 2 illustrates a diagram 200 of a set of positive input samples and a set of negative input samples, in accordance with some implementations. FIG. 3A illustrates a diagram 300 of feature maps generated, in accordance with some implementations. FIG. 3B illustrates a diagram 301 of an example Gram-matrix computation based on the feature maps of FIG. 3A, in accordance with some implementations. FIG. 4 is a diagram 400 of a set of distinctive-style features identified based on the set of positive input samples and the set of negative input samples of FIG. 2, in accordance with some implementations. FIG. 5 is a diagram 500 of input shapes and corresponding rendered assets, in accordance with some implementations. FIGS. 2-5 will be described together.

Instead of using feature maps directly, the machine-learning component 130 identifies distinctive-style features based on the correlations between feature maps using a Gram-matrix, as described below with reference to FIGS. 2, 3A, and 3B.

Referring to FIGS. 2 and 3A, the feature maps 302 may be generated based on a set of positive input samples 202 and a set of negative input samples 204. For instance, the set of positive input samples 202 may include images of shapes of a same style (e.g., letters in Serif font), while the set of negative input samples 204 may include images of shapes of a different style (e.g., letters in Serif font and San-Serif font). The machine-learning component 130 may measure the similarity between two shapes (e.g., letter or number font, 2D object, 3D object, etc.) based on the overall difference in their filter response correlations. This representation has the advantage of eliminating positional information, making it location independent.

In the non-limiting example of FIG. 2, the positive input samples 202 includes images of the letters D, K, S, and W, which are all in the San-Serif font. That is, the set of positive input samples 202 include shapes of the same style. The negative input samples 204 include one or more shape pairs of different styles. For instance, the negative input samples 204 includes a pair of Ds, a pair of Ks, a pair of Ss, and a pair of Ws. Each shape pair in the set of negative input samples 204 includes a first shape of a first style (e.g., San-Serif font) and a second shape of a second style (e.g., Serif font). While FIG. 2 illustrates styles that are defined in human-understandable ways, more complex styles may be used for visual assets on a virtual environment platform, and may be distinguished based on visual appearance without specific style-names being associated with individual styles.

The machine-learning component 130 may generate a first set of feature maps associated with the set of positive input samples 202 and a second set of feature maps associated with the set of negative input samples 204. The first set of feature maps may be generated by applying a set of convolution filters to the set of positive input samples 202, and the second set of feature maps may be generated by applying the set of convolution filters to the set of negative input samples 204. By way of example, the set of convolution filters may include kernels of sizes 5×5, 7×7, and 9×9, or any other suitable size. Individual filters within the set of convolution filters operate independently of other filters in the set. This means that the machine-learning component 130 may input the same input shapes into each filter separately. The output of the set of convolution filters may be a set of feature maps 302 (referred to hereinafter as "feature maps 302"), as depicted in FIG. 3A.

Referring to FIG. 3A, the machine-learning component 130 may flatten the feature maps 302 to obtain flattened horizontal feature maps 304a and flattened vertical feature maps 304b. Flattened horizontal feature maps 304a Fr may be obtained by arranging individual rows in a feature map as a one-dimensional (1D) horizontal vector. Flattened vertical feature maps 304b $$F_x^T$$

may be obtained by applying a matrix transpose to the flattened horizontal feature maps 304a. For ease of depiction, flattened horizontal feature maps 304a and flattened vertical feature maps 304b are not shown to scale in FIG. 3A.

Referring to FIG. 3B, provided a set of feature maps $F_x$, where $x \in [1, n]$ and n denotes the number of convolution filters (e.g., 3 convolution filters of different sizes), the machine-learning component 130 may compute a corresponding Gram matrix 306 $G_x$ by firstly defining a feature map matrix M, where its $x^{th}$ row is determined by the feature map Fr. Finally, the machine-learning component 130 may compute the Gram matrix 306 as $$G_x = F_x F_x^T,$$

which is the inner product between pairs of feature map vectors in the flattened horizontal feature maps 404a and the flattened vertical feature maps 404b.

As illustrated in FIG. 3B, the Gram matrix 306 captures feature correlation between each row-column pair in the flattened horizontal feature maps 304a and the flattened vertical feature maps 304b. If the feature-correlation value for a row-column pair is high, this indicates that the image has the feature captured by the first feature map and the feature captured by the second feature map. Conversely, a relatively low feature-correlation value indicates that the image does not have the feature captured by the first feature map from the flattened horizontal feature maps 304a and the feature captured by the second feature map from the flattened vertical feature maps 304b.

Using the feature-correlation differences, the machine-learning component 130 may compute a loss function. The loss function compares the Gram matrices and solves for the set of filter weights whose corresponding feature-map correlations minimize the function in equation (1).

$$\arg_F \min f(F) = \sum_{i,j \in I^+} \| |G_i| - |G_j| \|_F^2 + \sum_{i,j \in I^-} - \| |G_i| - |G_j| \|_F^2, \quad (1)$$

where $I^+$ represents the set of positive input samples 202, $I^-$ represents the set of negative input samples 204, i represents a first shape, and j represents a second shape. In equation (2), the summation for $I^+$ minimizes the Gram-matrix differences (for a first set of Gram Matrix pairs) among same-style shapes $(i,j \in I^+)$ to identify style features that frequently occur within the same style. To identify style features that occur in one style but not in other styles, the summation for $I^-$ in equation (2) maximizes the Gram-matrix differences (for a second set of Gram Matrix pairs) among distinct-style shapes $(i,j \in I^-)$.

Examples of the distinctive-style features captured by the loss function shown in equation (2) are depicted in FIG. 4. Using the loss function, the machine-learning component 130 identifies a set of distinctive-style features for the Serif font. For instance, the set of distinctive-style features may capture the Serif decorations 402 and change of thickness 404 as the distinctive-style features distinguishing the San-Serif-font style (left column) and the Serif-font style (right column).

Referring to FIG. 5, once the kernel weights for the CNN filters are trained using the loss function, the machine-learning component 130 may identify distinctive-style features for any input shape 502. The machine-learning component 130 may render an asset 504 to include the distinctive-style features of the input shape 502. The visual style of an input asset (not shown) (e.g., an existing cow shape from an asset repository or a new cow shape) may be manipulated or transformed to match the visual style of input shape 502. For instance, when designing a virtual experience, a user may input image data associated with a circle or sphere into the machine-learning component 130. Using the trained CNN filters, the distinctive-style features, which include rounded features, may be identified for the circle or sphere. The machine-learning component 130 may apply the rounded features to the features of a cow such that the asset's body shape, head shape, leg shape, horn shape, ear shape, etc. are styled with the rounded features of the user's input image shape.

Hereinafter, a more detailed discussion of methods to train and use a CNN of the present disclosure is presented with reference to FIGS. 6A and 6B.

Figure 6A:
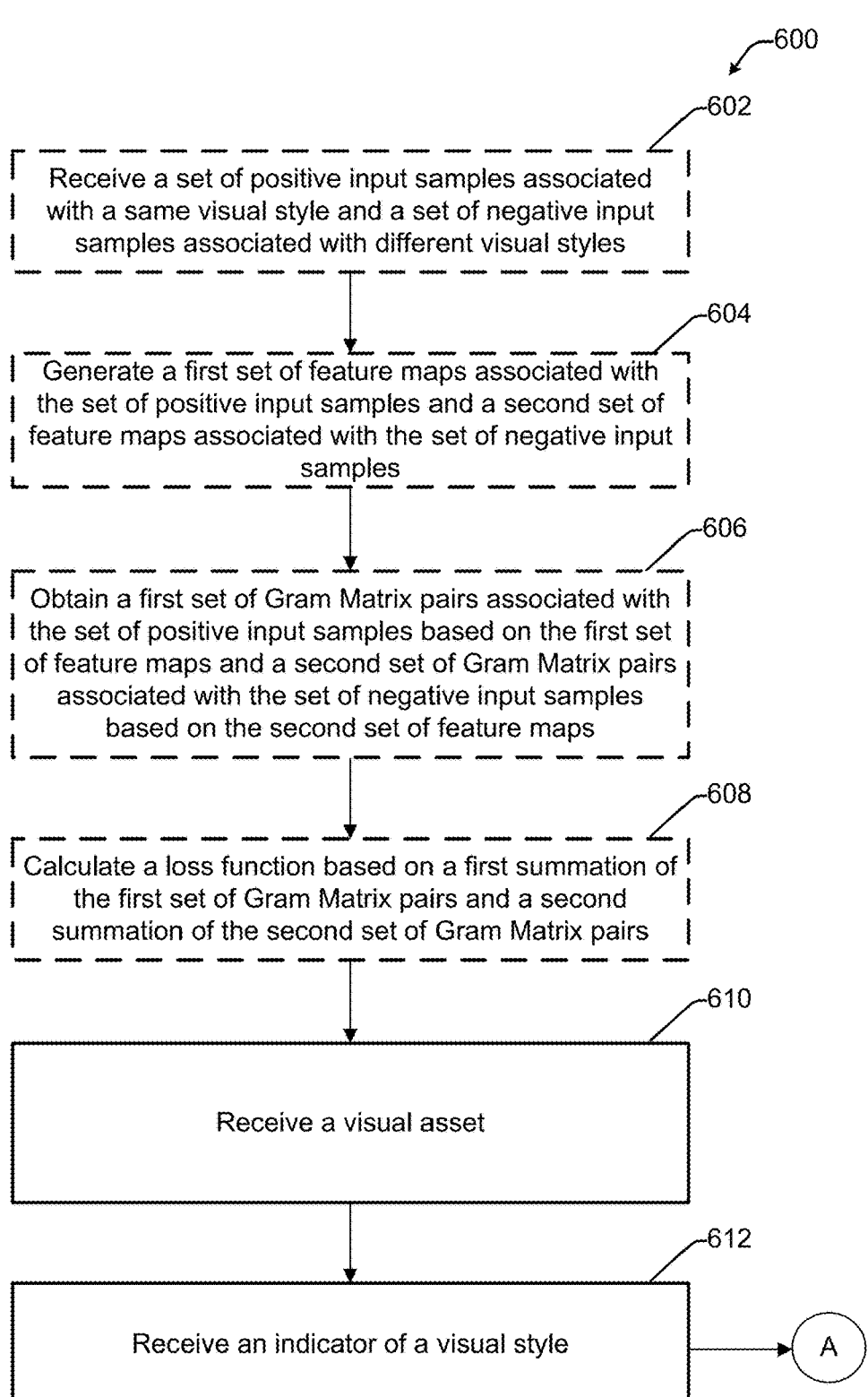
FIGS. 6A and 6B are a flowchart of an example method of training and using a convolutional neural network (CNN) to identify distinctive-style features, in accordance with some implementations.
Figure 6B:
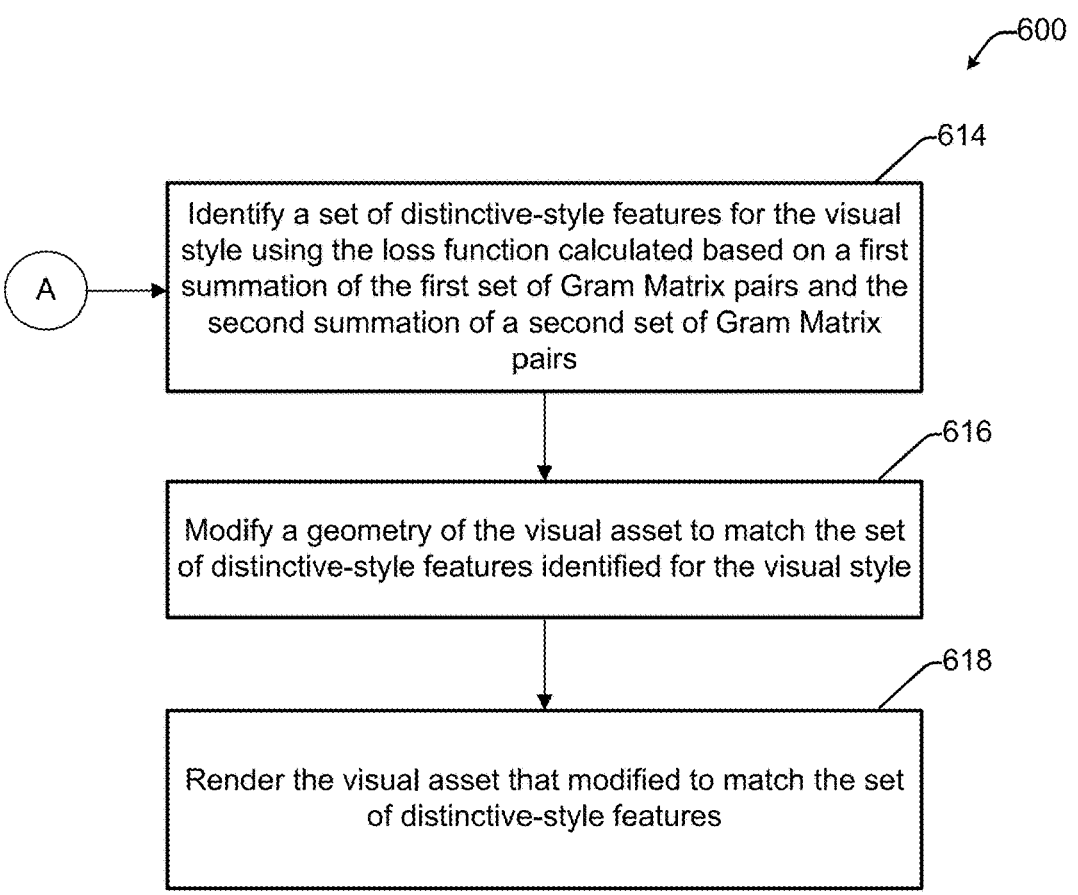

FIGS. 6A and 6B: Example Method(s) to Train and Use a CNN

FIGS. 6A and 6B are a flowchart of a method 600 for training and using a CNN to render a scene based on distinctive-style features of an input shape, in accordance with some implementations.

In some implementations, method 600 can be implemented, for example, on a server 102 described with reference to FIG. 1. In some implementations, some or all of the method 600 can be implemented on one or more client devices 110 as shown in FIG. 1, on one or more developer devices (not illustrated), or on one or more server device(s) 102, and/or on a combination of developer device(s), server device(s) and client device(s). In described examples, the implementing system includes one or more digital processors or processing circuitry ("processors"), and one or more storage devices (e.g., a data store 108 or other storage). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

In some implementations, method 600, or portions of the methods, can be initiated automatically by a system. In some implementations, the implementing system is a first device. For example, the method (or portions thereof) can be periodically performed, or performed based on one or more particular events or conditions, e.g., upon a user request, upon the receipt of an input shape, and/or one or more other conditions occurring which can be specified in settings read by the methods. Referring to FIG. 6A, method 600 may begin at block 602. At block 602, a set of positive input samples associated with a same visual style and a set of negative input samples associated with different visual styles may be received. For example, referring to FIGS. 1 and 2, the machine-learning component 130 may receive a set of positive input samples 202 that includes images of shapes of a same style (e.g., letters in serif font) and a set of negative input samples 204 that includes images of shapes of a different style (e.g., letters in Serif font and San-Serif font).

Block 604 may follow block 602. At block 604, a first set of feature maps associated with the set of positive input samples and a second set of feature maps associated with the set of negative input samples may be generated. For example, referring to FIGS. 1 and 3A, the machine-learning component 130 may generate feature maps 302 based on a set of positive input samples 202 (e.g., a first set of feature maps) and a set of negative input samples 204 (e.g., a second set of feature maps). For instance, the set of positive input samples 202 may include images of shapes of a same style (e.g., letters in serif font), while the set of negative input samples 204 may include images of shapes of a different style (e.g., letters in Serif font and San-Serif font).

Block 606 may follow block 604. At block 606, a first set of Gram Matrix pairs associated with the set of positive input samples based on the first set of feature maps and a second set of Gram Matrix pairs associated with the set of negative input samples based on the second set of feature maps may be obtained. For example, referring to FIGS. 1 and 3B, provided a set of feature maps $F_x$, where $x \in [1, n]$ and n denotes the number of convolution filters (e.g., 3 convolution filters of different sizes), the machine-learning component 130 may compute a corresponding Gram matrix 306 $G_x$ by firstly defining a feature map matrix M, where its $x^{th}$ row is determined by the feature map Fr. Finally, the machine-learning component 130 may compute the Gram matrix 306 as $G_x = MM^T$, which is the inner product between all pairs of feature map vectors in the flattened horizontal feature maps 404a and the flattened vertical feature maps 404b. As illustrated in FIG. 3B, the Gram matrix 306 captures feature correlation between each row-column pair in the flattened horizontal feature maps 304a and the flattened vertical feature maps 304b. If the feature-correlation value for a row-column pair is high, this indicates that the image has the feature captured by the first feature map and the feature captured by the second feature map. Conversely, a relatively low feature-correlation value indicates that the image does not have the feature captured by the first feature map from the flattened horizontal feature maps 304a and the feature captured by the second feature map from the flattened vertical feature maps 304b.

Block 608 may follow block 606. At block 608, a loss function based on a first summation of differences among the first set of Gram Matrix pairs and a second summation of differences among the second set of Gram Matrix pairs may be calculated. For example, referring to FIGS. 1 and 4, using the feature-correlation differences, the machine-learning component 130 may compute a loss function. The loss function compares the Gram matrices and solves for the set of filter weights whose corresponding feature-map correlations minimize the energy of equation (2).

Block 610 may follow block 608. At block 610, a visual asset may be received. For example, referring to FIG. 1, the machine-learning component 130 may receive image data associated with a visual asset (e.g., an image, object, or scene). The image data may be associated with a single visual asset or may be associated with all visual assets in a scene to be rendered.

Block 612 may follow block 610. At block 612, an indicator of visual style may be received. For example, referring to FIGS. 1 and 5, the machine-learning component 130 may receive an input shape 502 (an indicator of visual style) of an image, object, or scene. The input shape 502 may be selected and input by a user, for example. The input shape 502 may be associated with a particular visual style.

Referring to FIG. 6B, block 614 may follow block 612. At block 614, a set of distinctive-style features for the visual style may be identified using the loss function calculated based on a first summation of differences among the first set of Gram Matrix pairs and the second summation of differences among the second set of Gram Matrix pairs. For example, referring to FIGS. 1 and 4, examples of the distinctive-style features captured by the loss function shown in equation (2) are depicted. Using the loss function, the machine-learning component 130 is able to identify a set of distinctive-style features for the Serif font. For instance, the set of distinctive-style features may capture the Serif decorations 402 and change of thickness 404 as the distinctive-style features distinguishing the San-Serif-font style (left column) and the Serif-font style (right column).

Block 616 may follow block 614. At block 616, the geometry of the visual asset may be modified to match the set of distinctive-style features identified for the visual style. For example, referring to FIGS. 1 and 5, once the kernel weights for the CNN filters are trained using the loss function, the machine-learning component 130 may identify distinctive-style features for any input shape 502. The machine-learning component 130 may adjust the shape of an asset 504 to include the distinctive-style features of the input shape 502. For instance, when designing a virtual experience, a user may input image data associated with a circle or sphere into the machine-learning component 130. Using the trained CNN filters, the distinctive-style features, which include rounded features, may be identified for the circle or sphere. The machine-learning component 130 may apply the rounded features to the features of a cow such that the asset's body shape, head shape, leg shape, horn shape, ear shape, etc. are styled with the rounded features of the user's input image shape. In some implementations, the machine-learning component 130 may modify one or more of the vertex positions of the visual asset's mesh to match the distinctive-style features identified for the visual style and/or the texture of the visual asset to match the distinctive-style features.

Block 618 may follow block 616. At block 618, the visual asset modified based on the set of distinctive-style features may be rendered. Block 618 may conclude the operations. For example, FIG. 7: Computing Device Hereinafter, a more detailed description of various computing devices that may be used to implement different devices and/or components illustrated in FIG. 1 is provided with reference to FIG. 7.

Figure 7:
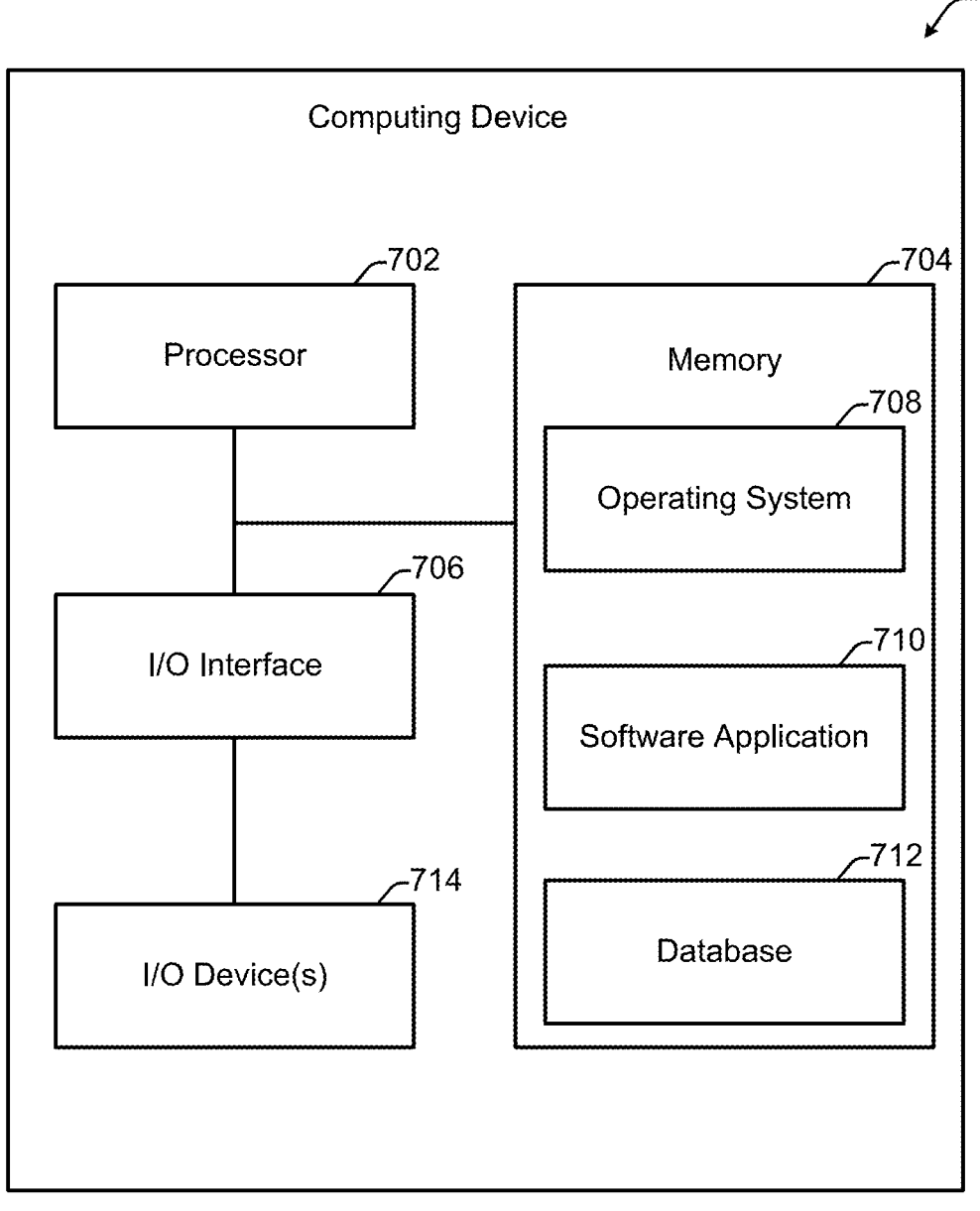
FIG. 7 is a block diagram illustrating an example computing device, in accordance with some implementations.

FIG. 7 is a block diagram of an example computing device 700 which may be used to implement one or more features described herein, in accordance with some implementations. In one example, device 700 may be used to implement a computer device, (e.g., 102, 110 of FIG. 1), and perform appropriate operations as described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 700 includes a processor 702, a memory 704, input/output (I/O) interface 706, and audio/video input/output devices 714 (e.g., display screen, touchscreen, display goggles or glasses, audio speakers, headphones, microphone, etc.).

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, software application 710 and associated database 712. In some implementations, the applications 710 can include instructions that enable processor 702 to perform the functions described herein. Software application 710 may include some or all of the functionality required to train CNN filters to capture distinctive-style features of an input shape and to manipulate the geometry of assets to conform to the distinctive-style features of the input shape. In some implementations, one or more portions of software application 710 may be implemented in dedicated hardware such as an application-specific integrated circuit (ASIC), a programmable logic device (PLD), a field-programmable gate array (FPGA), a machine learning processor, etc. In some implementations, one or more portions of software application 710 may be implemented in general purpose processors, such as a central processing unit (CPU) or a graphics processing unit (GPU). In various implementations, suitable combinations of dedicated and/or general purpose processing hardware may be used to implement software application 710.

For example, software application 710 stored in memory 704 can include instructions required to train CNN filters to capture distinctive-style features of an input shape and to manipulate the geometry of assets to conform to the distinctive-style features of the input shape or software such as the machine-learning component 130. Any of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 108), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 7 shows one block for each of processor 702, memory 704, I/O interface 706, operating system 708, software application 710, and database 712. These blocks may represent one or more processors or processing circuitries, operating systems, memories, I/O interfaces, applications, and/or software modules. In other implementations, device 700 may not have all of the components shown and/or may have other elements including other types of elements instead of, or in addition to, those shown herein. While the virtual experience server 102 are described as performing operations as described in some implementations herein, any suitable component or combination of components of virtual experience server 102, or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
   receiving, by a processor, a visual asset;
   receiving, by the processor, an indicator of a visual style;
   identifying, by the processor, a set of distinctive-style features for the visual style using a loss function calculated based on a first summation of differences among a first set of Gram Matrix pairs and a second summation of differences among a second set of Gram Matrix pairs, the first set of Gram Matrix pairs being associated with a set of positive input samples of a same visual style and the second set of Gram Matrix pairs being associated with a set of negative input samples of different visual styles;
   modifying, by the processor, a geometry of the visual asset to match the set of distinctive-style features identified for the visual style; and
   after the modifying, rendering, by the processor, the visual asset that matches the set of distinctive-style features.

2. The method of claim 1, further comprising:
   receiving, by the processor, the set of positive input samples of the same visual style and the set of negative input samples of the different visual styles;
   generating, by the processor, a first set of feature maps associated with the set of positive input samples and a second set of feature maps associated with the set of negative input samples;
   obtaining, by the processor, the first set of Gram Matrix pairs associated with the set of positive input samples based on the first set of feature maps and the second set of Gram Matrix pairs associated with the set of negative input samples based on the second set of feature maps; and
   calculating, by the processor, the loss function based on the first summation of differences of the first set of Gram Matrix pairs and the second summation of the second set of Gram Matrix pairs.

3. The method of claim 2, wherein:

the set of positive input samples associated with the same visual style include a first set of shape pairs of a same style, and the set of negative input samples associated with the different visual styles include a second set of shape pairs of different styles.

4. The method of claim 3, wherein one shape of the second set of shape pairs has the same style as the style of the first set of shape pairs.

5. The method of claim 2, wherein generating the first set of feature maps associated with the set of positive input samples and the second set of feature maps associated with the set of negative input samples comprises:

applying, by the processor, a set of convolution filters to the set of positive input samples to generate the first set of feature maps; and applying, by the processor, the set of convolution filters to the set of negative input samples to generate the second set of feature maps.

6. The method of claim 5, wherein the set of convolution filters include kernels of different sizes.

7. The method of claim 2, wherein obtaining the first set of Gram Matrix pairs associated with the set of positive input samples based on the first set of feature maps and a second set of Gram Matrix pairs associated with the set of negative input samples based on the second set of feature maps comprises:

determining, by the processor, a first correlation among the first set of feature maps associated with set of positive input samples to obtain the first set of Gram Matrix pairs; and determining, by the processor, a second correlation among the second set of feature maps associated with the set of negative input samples to obtain the second set of Gram Matrix pairs.

8. A computing device, comprising:

a processor; and a memory coupled to the processor, with instructions stored thereon that, when executed by the processor, cause the processor to perform operations comprising:

receiving a visual asset;

receiving an indicator of a visual style;

identifying a set of distinctive-style features for the visual style using a loss function calculated based on a first summation of differences among a first set of Gram Matrix pairs and a second summation of differences among a second set of Gram Matrix pairs, the first set of Gram Matrix pairs being associated with a set of positive input samples of a same visual style and the second set of Gram Matrix pairs being associated with a set of negative input samples of different visual styles;

modifying a geometry of the visual asset to match the set of distinctive-style features identified for the visual style; and after the modifying, rendering the visual asset that matches the set of distinctive-style features.

9. The computing device of claim 8, further comprising:

receiving the set of positive input samples of the same visual style and the set of negative input samples of the different visual styles;

generating a first set of feature maps associated with the set of positive input samples and a second set of feature maps associated with the set of negative input samples;

obtaining the first set of Gram Matrix pairs associated with the set of positive input samples based on the first set of feature maps and the second set of Gram Matrix pairs associated with the set of negative input samples based on the second set of feature maps; and calculating the loss function based on the first summation of differences among the first set of Gram Matrix pairs and the second summation of differences among the second set of Gram Matrix pairs.

10. The computing device of claim 9, wherein:

the set of positive input samples associated with the same visual style include a first set of shape pairs of a same style, and the set of negative input samples associated with the different visual styles include a second set of shape pairs of different styles.

11. The computing device of claim 10, wherein one shape of the second set of shape pairs has the same style as the style of the first set of shape pairs.

12. The computing device of claim 8, wherein generating the first set of feature maps associated with the set of positive input samples and the second set of feature maps associated with the set of negative input samples comprises:

applying a set of convolution filters to the set of positive input samples to generate the first set of feature maps; and applying the set of convolution filters to the set of negative input samples to generate the second set of feature maps.

13. The computing device of claim 12, wherein the set of convolution filters include kernels of different sizes.

14. The computing device of claim 9, wherein obtaining the first set of Gram Matrix pairs associated with the set of positive input samples based on the first set of feature maps and a second set of Gram Matrix associated with the set of negative input samples based on the second set of feature maps comprises:

determining a first correlation among the first set of feature maps associated with set of positive input samples to obtain the first set of Gram Matrix pairs; and determining a second correlation among the second set of feature maps associated with the set of negative input samples to obtain the second set of Gram Matrix pairs.

15. A non-transitory computer-readable medium with instructions stored thereon that, when executed by a processor, cause the processor to perform operations comprising:

receiving a visual asset;

receiving an indicator of a visual style;

identifying a set of distinctive-style features for the visual style using a loss function calculated based on a first summation of differences among a first set of Gram Matrix pairs and a second summation of differences among a second set of Gram Matrix pairs, the first set of Gram Matrix pairs being associated with a set of positive input samples of a same visual style and the second set of Gram Matrix pairs being associated with a set of negative input samples of different visual styles;

modifying a geometry of the visual asset to match the set of distinctive-style features identified for the visual style; and after the modifying, rendering the visual asset that matches the set of distinctive-style features.

16. The non-transitory computer-readable medium of claim 15, further comprising:

receiving the set of positive input samples of the same visual style and the set of negative input samples of the different visual styles;

generating a first set of feature maps associated with the set of positive input samples and a second set of feature maps associated with the set of negative input samples;

obtaining the first set of Gram Matrix pairs associated with the set of positive input samples based on the first set of feature maps and the second set of Gram Matrix pairs associated with the set of negative input samples based on the second set of feature maps; and calculating the loss function based on a first summation of difference among the first set of Gram Matrix pairs and a second summation of differences among the second set of Gram Matrix pairs.

17. The non-transitory computer-readable medium of claim 16, wherein:

the set of positive input samples associated with the same visual style include a first set of shape pairs of a same style, and the set of negative input samples associated with the different visual styles include a second set of shape pairs of different styles.

18. The non-transitory computer-readable medium of claim 17, wherein one shape of the second set of shape pairs has the same style as the style of the first set of shape pairs.

19. The non-transitory computer-readable medium of claim 15, wherein generating the first set of feature maps associated with the set of positive input samples and the second set of feature maps associated with the set of negative input samples comprises:

applying a set of convolution filters to the set of positive input samples to generate the first set of feature maps; and applying the set of convolution filters to the set of negative input samples to generate the second set of feature maps.

20. The non-transitory computer-readable medium of claim 19, wherein the set of convolution filters include kernels of different sizes.

* * * * *